United States Patent Office 3,272,871
Patented Sept. 13, 1966

3,272,871
FLUOROCARBON-HYDROCARBON POLYETHERS
Joseph Leo Warnell, Wilmington, Del., assignor to E. I. du Pont de Nemours and Company, Wilmington, Del., a corporation of Delaware
No Drawing. Filed Feb. 1, 1962, Ser. No. 170,499
5 Claims. (Cl. 260—615)

The present invention relates to novel fluorocarbon-hydrocarbon polyethers, and, more particularly, to polyethers obtained by the reaction of tetrafluoroethylene epoxide with aliphatic ethers or polyethers.

The novel fluorocarbon-hydrocarbon polyethers have the general formula

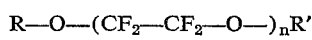

where $n$ is the number of divalent tetrafluoroethylene epoxide units in the polyether and is from one to 20, and R and R' are radicals selected from the class consisting of alkyl radicals and alkoxy substituted alkyl radicals, said alkyl radicals having from one to 6 carbon atoms.

The novel fluorocarbon-hydrocarbon polyethers are prepared by the reaction of tetrafluoroethylene epoxide with aliphatic ethers or polyethers in accordance with the following reaction scheme:

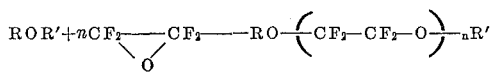

where $n$, R, and R' are as indicated above.

The aliphatic ethers and polyether employed in the present invention have, preferably, alkyl radicals of one to 6 carbon atoms. As indicated above, mono- and polyethers may be employed. Thus, suitable ether reagents include dimethyl ether, diethyl ether, ethyl methyl ether, ethyl propyl ether, hexyl methyl ether, the dimethyl ether of ethylene glycol, the diethyl ether of ethylene glycol, the dimethyl ether of diethylene glycol, and the dimethyl ether of triethylene glycol.

The reaction is carried out by contacting the ether with the tetrafluoroethylene epoxide at a temperature of −80 to +50° C. and, preferably, at a temperature of −60 to +20° C. in the absence of any additional reagents. If desired, inert fluorocarbon solvents, such as perfluorodimethylcyclobutane, can be added as diluents. In general, the reaction is carried out by combining the ether and the tetrafluoroethylene epoxide in the reaction vessel at temperatures at which the reaction is slow, i.e., temperatures of about −80° C. or lower and then allowing the mixture to warm to temperatures at which rapid reaction occurs.

Tetrafluoroethylene epoxide, B.P. −63.5±1° C., is obtained by the oxidation of tetrafluoroethylene with molecular oxygen under the influence of actinic radiation in the presence of traces of a halogen such as bromine.

The invention is further illustrated by the following examples.

Example I

Into a dry 50 ml. flask attached to a manifold system was placed 10 ml. of anhydrous diethyl ether. The flask was cooled to −80° C. and 3 g. of tetrafluoroethylene epoxide was condensed into the flask. No reaction was observed at −80° C., but on warming to −20° C. reaction of the epoxide became apparent by the change in gas pressure. Additional tetrafluoroethylene epoxide was added at −20° C. to maintain a pressure of 5 p.s.i. until no further uptake occurred. The reaction mixture was warmed to room temperature; only a trace of material boiling below room temperature was obtained. The product was distilled at atmospheric pressure to give 4.5 ml. of the diethyl ether of tetrafluoroethylene glycol (B.P. 128–130° C.) and 1 ml. of the diethyl ether of octafluorodiethylene glycol. Both compounds were identified by infrared spectra. In addition, the diethyl ether of tetrafluoroethylene glycol exhibited an n.m.r. spectrum consistent with the assigned structure and satisfactory elemental analysis.

Analysis.—Calcd.: C, 37.9; H, 5.3; F, 40.0. Found: C, 37.9; H, 5.4; F, 40.5

Example II

Into a dry 50 ml. flask attached to a manifold system were placed 4 ml. of dimethyl ether and 2 g. of tetrafluoroethylene epoxide at −196° C. The reaction mixture was warmed to 0° C., at which temperature complete reaction of the tetrafluoroethylene epoxide occurred. The product consisted mainly of the dimethyl ether of tetrafluoroethylene glycol together with small amounts of the dimethyl ether of octafluorodiethylene glycol.

Example III

Into a dry 50 ml. flask attached to a manifold system was introduced 50 ml. of dry diethylene glycol dimethyl ether. The flask was cooled to −80° C. and 17 g. of tetrafluoroethylene epoxide was added. The reaction mixture was slowly warmed to −60° C. for a period of 3 hours during which time complete consumption of the tetrafluoroethylene epoxide occurred. The reaction mixture was washed with water to remove the dimethyl ether of diethylene glycol. There remained 12 g. of clear oil which by infrared and chemical analysis was shown to be a dialkyl ether of polytetrafluoroethylene glycol containing from 5 to 9 units of —$CF_2$—$CF_2$—O—.

Example IV

Using the procedure of Example III, a polyether containing polytetrafluoroethylene glycol units was formed by using the dimethyl ether of ethylene glycol instead of the dimethyl ether of diethylene glycol.

The products of the present invention are a unique combination of hydrocarbon and fluorocarbon ethers. The products are, therefore, extremely useful solvents and lubricants combining the solvent power and lubricating properties of hydrocarbon ethers with those of fluorocarbon ethers. The products, furthermore, are chemically inert, thermally stable and non-flammable.

In view of the high reactivity of tetrafluoroethylene epoxide utmost caution is advised in the use and handling of this compound.

I claim:
1. A fluorocarbon-hydrocarbon polyether having the formula

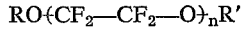

where $n$ is the number of divalent tetrafluoroethylene epoxide units in the polyether and is from one to 20, and R and R' are radicals selected from the class consisting of alkyl radicals and alkoxy substituted alkyl radicals, said radicals having from one to 6 carbon atoms.

2. The product of claim 1 wherein R and R' are methyl groups.

3. The product of claim 1 wherein R and R' are ethyl groups.

4. The product of claim 1 wherein R is a methyl group and R' is a methoxyethyl group.

5. The process of preparing a fluorocarbon-hydrocarbon polyether having the formula $RO(CF_2-CF_2-O)_nR'$ wherein $n$ is the number of divalent tetrafluoroethylene epoxide units in said polyether and is from one to 20 and R and R' are radicals selected from the class consisting of alkyl radicals and alkoxy substituted alkyl radicals, said radicals having from one to 6 carbon atoms, said process consisting essentially of reacting tetrafluoroethylene epoxide with a hydrocarbon ether having the formula ROR', wherein R and R' have the same meaning as previously stated in this claim, at a temperature of −80 to +50° C.

References Cited by the Examiner

UNITED STATES PATENTS

| | | | |
|---|---|---|---|
| 2,433,844 | 1/1948 | Hanford | 260—615 X |
| 2,500,388 | 3/1950 | Simons | 260—615 X |

FOREIGN PATENTS

| | | |
|---|---|---|
| 449,807 | 7/1948 | Canada. |
| 583,874 | 1/1947 | Great Britain. |
| 672,720 | 5/1952 | Great Britain. |

OTHER REFERENCES

Dermer et al.: Jour. Amer. Chem. Soc., vol. 76 (1954), pp. 912–913.

References Cited by the Applicant

Fluorine Chemistry, Academic Press, Inc., New York (1950), Edited by J. H. Simons, p. 213, vol. II and p. 402, vol. I.

LEON ZITVER, *Primary Examiner.*

B. HELFIN, H. T. MARS, *Assistant Examiners.*